US012603213B2

(12) United States Patent
Ochiai

(10) Patent No.: US 12,603,213 B2
(45) Date of Patent: Apr. 14, 2026

(54) INDUCTOR CORE, ELECTRONIC PEN CORE BODY PORTION, ELECTRONIC PEN, AND INPUT DEVICE

(71) Applicant: KYOCERA Corporation, Kyoto (JP)

(72) Inventor: Hitomi Ochiai, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 1052 days.

(21) Appl. No.: 17/764,860

(22) PCT Filed: Sep. 28, 2020

(86) PCT No.: PCT/JP2020/036602
§ 371 (c)(1),
(2) Date: Mar. 29, 2022

(87) PCT Pub. No.: WO2021/065789
PCT Pub. Date: Apr. 8, 2021

(65) Prior Publication Data
US 2022/0344089 A1     Oct. 27, 2022

(30) Foreign Application Priority Data

Sep. 30, 2019    (JP) ................................. 2019-179682

(51) Int. Cl.
*G06F 3/0354*       (2013.01)
*H01F 1/34*         (2006.01)
*H01F 17/04*        (2006.01)
*H01F 27/255*       (2006.01)

(52) U.S. Cl.
CPC ....... *H01F 17/045* (2013.01); *G06F 3/03545* (2013.01); *H01F 1/344* (2013.01); *H01F 27/255* (2013.01)

(58) Field of Classification Search
CPC ..... G06F 3/03545; H01F 17/045; H01F 17/04
See application file for complete search history.

(56) References Cited

U.S. PATENT DOCUMENTS

2019/0025951 A1     1/2019   Kamiyama et al.
2021/0011564 A1     1/2021   Ochiai

FOREIGN PATENT DOCUMENTS

WO      2017/183526 A1    10/2017
WO      2019/189938 A1    10/2019

*Primary Examiner* — Koosha Sharifi-Tafreshi
(74) *Attorney, Agent, or Firm* — Procopio, Cory, Hargreaves & Savitch LLP

(57)                ABSTRACT

An inductor core includes a tubular shaped or pillar shaped magnetic main body comprising a magnetic material. The magnetic main body includes: an inclined portion including an inclined surface with an outer circumferential surface of a truncated cone having an outer diameter increasing from one end of the magnetic main body toward the other end; and a straight body portion that is coaxial with the inclined portion and extends from the other end toward the one end, the straight body portion being connected to the inclined portion and including an outer peripheral surface with an outer circumferential surface of a circle tubular body or a cylindrical column body. A skewness Rsk of an outer peripheral surface of the straight body portion located near the inclined portion is smaller than a skewness Rsk of an outer peripheral surface of the straight body portion located near the other end.

20 Claims, 8 Drawing Sheets

INDUCTOR CORE, ELECTRONIC PEN CORE BODY PORTION, ELECTRONIC PEN, AND INPUT DEVICE

TECHNICAL FIELD

The present invention relates to an inductor core, an electronic pen core body portion, an electronic pen, and an input device.

BACKGROUND ART

There is an input device that detects positions on a tablet or a display provided with a position detection sensor for inputting position information into a personal computer (PC), a smartphone, or the like. In this input device, an electronic pen is used to give instruction of a position on the position detection sensor.

Position detection signals are exchanged between the position detection sensor and the electronic pen through a coupling method such as an electromagnetic inductive coupling method or an electrostatic inductive coupling method. The exchange of position detection signals enables the position detection device to perform detection (for example, Patent Document 1). An electronic pen used with such an input device includes an inductor core configured such that a magnetic body made of ferrite or the like is disposed around the core of the electronic pen.

CITATION LIST

Patent Literature

Patent Document 1: WO 2017/183526

SUMMARY

Technical Problem

A cover wire such as a litz wire, a USTC wire (polyurethane-tetoron single-strand copper wire), or a urethane wire is wound around a magnetic body core to form a coil. However, as the number of times the electronic pen writes increases, the coil wound at the front tip side is subject to less tension than that wound at the base end side. Thus, the coil at the front tip side is more likely to be displaced from the original winding position, and there is a possibility that malfunction occurs.

Solution to Problem

An inductor core according to the present disclosure includes a magnetic main body having a tubular shape or pillar shape and comprised of a magnetic material. The magnetic main body includes: an inclined portion including an inclined surface that constitutes an outer circumferential surface of a truncated cone having an outer diameter increasing from one end of the magnetic main body toward the other end; and a straight body portion that is coaxial with the inclined portion and extends from the other end toward the one end, the straight body portion being connected to the inclined portion and including an outer peripheral surface that constitutes an outer circumferential surface of a circular tubular body or a cylindrical column body. A skewness Rsk of an outer peripheral surface of the straight body portion located at or around the inclined portion is smaller than a skewness Rsk of an outer peripheral surface of the straight body portion located at or around the other end.

An electronic pen core body portion according to the present disclosure includes the inductor core, and a core body configured to be inserted into the inductor core and disposed in a manner such that a tip portion protrudes from one end of the inductor core.

An electronic pen according to the present disclosure includes a housing including an opening and the electronic pen core body portion. The electronic pen core body portion is accommodated in the housing, and the tip portion of the electronic pen core body portion protrudes from the opening of the housing or is disposed to be able to protrude from the opening of the housing.

An input device according to the present disclosure includes the electronic pen, and a position detection device including a sensor configured to detect a position at which the electronic pen approaches.

Advantageous Effects of Invention

With the inductor core according to the present disclosure, the front tip side of the outer peripheral surface has the reduced skewness Rsk. This makes the friction coefficient large at the front tip side. Thus, even if the coil at the front tip side is in a state where tension is less likely to act, the coil at the front tip side is less likely to be displaced from the original position where the coil is wound. This makes it possible to provide an inductor core that exhibits high reliability and in which malfunction is less likely to occur.

With the electronic pen core body portion according to the present disclosure, the coil of the electronic pen core body portion is less likely to be displaced from the original winding position. This makes it possible to provide an electronic pen core body portion that exhibits high reliability.

The electronic pen according to the present disclosure includes an electronic pen core body portion that exhibits high reliability. This makes it possible to provide an electronic pen that exhibits high reliability.

The input device according to the present disclosure includes the electronic pen that exhibits high reliability. This makes it possible to provide an input device that exhibits high reliability.

DESCRIPTION OF EMBODIMENTS

Figure 1:
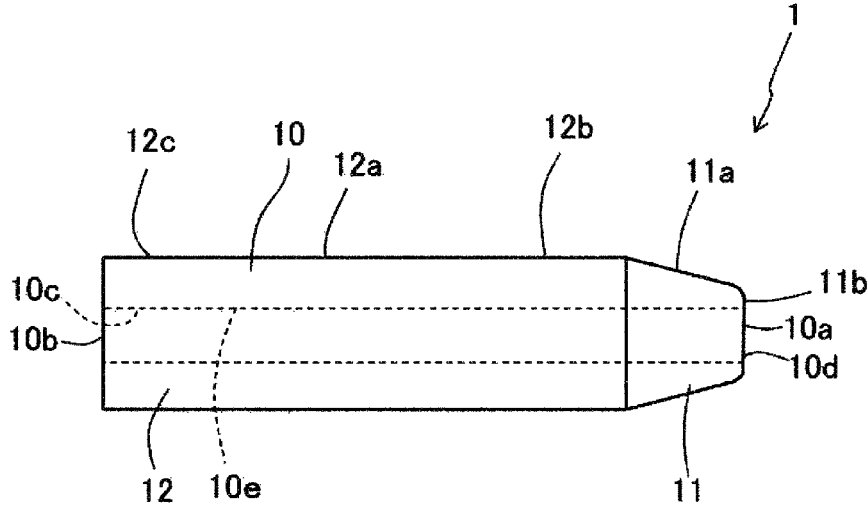
FIG. 1 is a plan view illustrating a first embodiment of an inductor core according to the present disclosure.

Below, an inductor core according to the present disclosure will be described in detail with reference to the drawings. FIG. 1 is a plan view illustrating an example of an inductor core according to a first embodiment. An inductor core 1 is configured with a magnetic main body 10 comprised of a magnetic material such as a ferrite sintered compact.

The inductor core 1 is configured with the magnetic main body 10 having a tubular shape, and includes a tubular hole 10c having a cylindrical column shape and extending from one end 10a to the other end 10b. The magnetic main body 10 includes an inclined portion 11 having an inclined surface 11a that constitutes an outer circumferential surface of a truncated cone having an outer diameter increasing from the one end 10a toward the other end 10b, and also includes a straight body portion 12 including an outer peripheral surface 12a of a tubular body extending from the other end 10b toward the one end 10a so as to be coaxial with the inclined portion 11, and the straight body portion 12 is connected to the inclined portion 11.

The length from the one end 10a of the magnetic main body 10 to the other end 10b is in a range of from approximately 5 mm to 50 mm. The tubular hole 10c has a diameter of from approximately 0.5 mm to 2.0 mm. The straight body portion 12 has a length of from approximately 3 mm to 12 mm. The straight body portion 12 has an outer diameter of from approximately 2.0 mm to 3.0 mm. The inclined portion 11 has a length of form approximately 0.5 mm to 2.0 mm. The outer diameter of the inclined portion 11 at the one end 10a side is from approximately 1 mm to 2 mm. The outer diameter of the inclined portion 11 at a side opposite from the one end 10a is substantially the same as the outer diameter of the straight body portion 12. In this manner, the inclined portion 11 has a tapered shape having a size that decreases toward the one end 10a.

Figure 2:
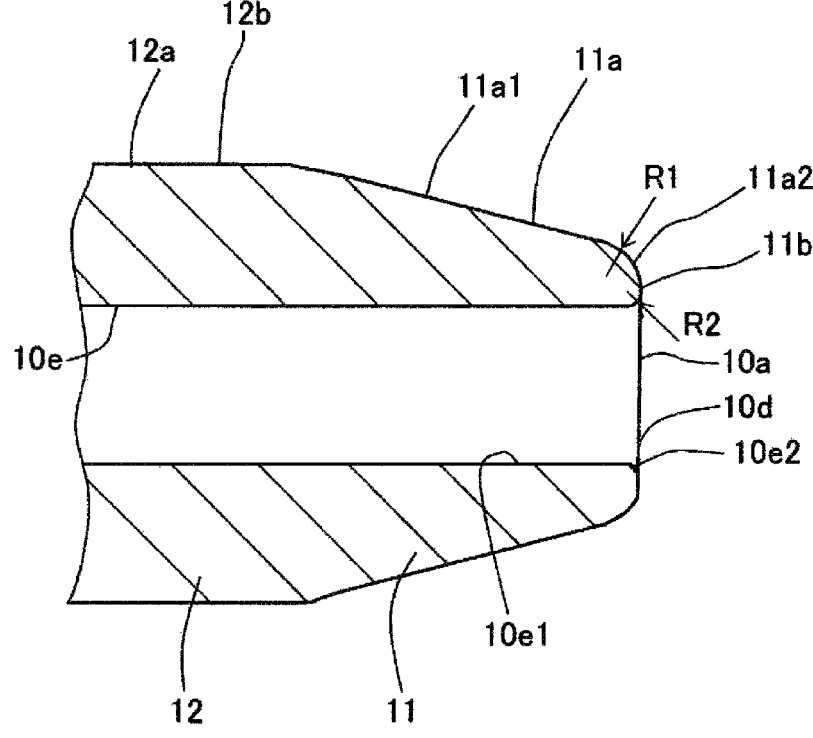
FIG. 2 is a partial cross-sectional view illustrating the first embodiment of the inductor core according to the present disclosure.

FIG. 2 is a partial cross-sectional view illustrating an example of the inductor core according to the first embodiment. In the cross-section taken along the central axis of the magnetic main body 10, the outer diameter of the inclined portion 11 increases from the one end 10a toward the other end 10b. That is, the inclined portion 11 has a tapered shape having a size that decreases toward the one end 10a.

The inclined surface 11a may include an inclined surface 11a1 that is a portion having a straight-line shape in a cross-sectional view, and an inclined surface 11a2 having a round shape. The inclined surface 11a1 may constitute the outer circumferential surface of the truncated cone. The inclined surface 11a at or around the one end 10a may be a curved surface having a convex shape. In other words, the inclined surface 11a1 of the inclined portion 11 and an end surface 11b of the inclined portion 11 may be connected at the inclined surface 11a2 that is a portion of the inclined surface 11a and is a curved surface having a convex shape.

In this manner, the inclined surface 11a1 and the end surface 11b are connected at the inclined surface 11a2 that is a curved surface having a convex shape. This makes it possible to reduce the possibility of breakage, for example, in a case where the end surface 11b of the inclined portion 11 is brought into contact with the housing of the electronic pen. When the electronic pen is inclined and brought into contact with the front surface of a tablet or the like, there is a possibility that the tip end including the one end 10a of the magnetic main body 10 as well as the core body is brought into contact with the tablet or the like. However, since the inclined surface 11a1 and the end surface 11b of the inclined portion 11 are connected at the inclined surface 11a2 that is a curved surface having a convex shape, there is no corner portion. This makes it possible to reduce the possibility of the front surface of the tablet or the like being damaged due to the inductor core 1.

At an inner peripheral surface 10e of the tubular hole 10c of the magnetic main body 10, the inner peripheral surface 10e located at or around an opening 10d at the inclined portion 11 side may have a rounded shape. The inner peripheral surface 10e may include an inner peripheral surface 10e1 and an inner peripheral surface 10e2 that is a curved surface having a convex shape and is configured to connect the inner peripheral surface 10e1 and the end surface 11b of the inclined portion 11. In a case where the inner surface of the tubular hole 10c and the end surface 11b of the inclined portion 11 are connected at the inner peripheral surface 10e2 that is a curved surface having a convex shape, it is possible to suppress stress concentration, for example, when the core body is pressed against the front surface of a tablet or the like. This makes it possible to reduce the possibility of damage to the magnetic main body 10. Thus, it is possible to achieve the inductor core 1 that exhibits high reliability.

In a cross section taken along the central axis of the magnetic main body 10, a radius of curvature R1 of the inclined surface 11a2 may be set to be greater than a radius of curvature R2 of the inner peripheral surface 10e2, where R1 is the radius of curvature of the inclined surface 11a2 where the inclined surface 11a1 of the inclined portion 11 and the end surface 11b of the inclined portion 11 are connected, and R2 is the radius of curvature of the inner peripheral surface 10e2 where the inner peripheral surface 10e1 of the tubular hole 10c and the end surface 11b of the inclined portion 11 are connected. The radius of curvature R1 of the inclined surface 11a2 is, for example, from 0.1 mm to 0.2 mm. The radius of curvature R2 of the inner peripheral surface 10e2 is, for example, from 0.02 mm to 0.08 mm.

Figure 3:
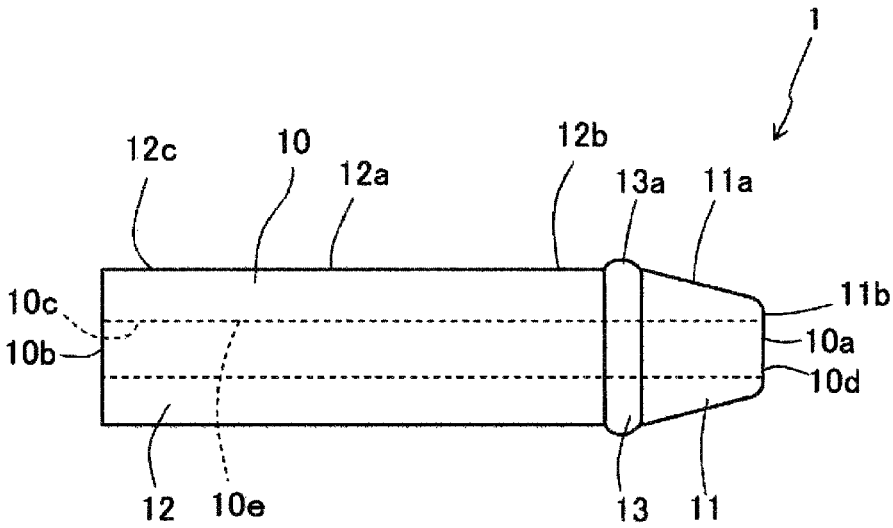
FIG. 3 is a plan view illustrating a second embodiment of the inductor core according to the present disclosure.

FIG. 3 is a plan view illustrating an example of an inductor core according to a second embodiment. There is a difference from the inductor core 1 according to the first embodiment in that the inclined portion 11 and the straight body portion 12 is connected through a flange portion 13. The magnetic main body 10 includes the inclined portion 11 including the inclined surface 11a that constitutes an outer circumferential surface of a truncated cone having an outer diameter increasing from the one end 10a toward the other end 10b, the straight body portion 12 constituting the outer peripheral surface 12a of a circular tubular body extending from the other end 10b toward the one end 10a so as to be coaxial with the inclined portion 11, and the flange portion 13 disposed between the inclined portion 11 and the straight body portion 12 and connecting the inclined portion 11 and the straight body portion 12. The inclined portion 11, the flange portion 13, and the straight body portion 12 are arranged in this order from the one end 10a toward the other end 10b. The outer peripheral surface 13a of the flange portion 13 has an outer diameter larger than each of the outer diameter of the inclined surface 11a of the inclined portion 11 and the outer diameter of the outer peripheral surface 12a of the straight body portion 12.

For example, in a case where the outer diameter of the straight body portion 12 except for the flange portion 13 is from 2.1 mm to 2.5 mm, the maximum value of the outer diameter of the outer peripheral surface 13a of the flange portion 13 is from 2.12 mm to 2.72 mm, and the flange portion 13 protrudes from the outer peripheral surface 12a of the straight body portion 12 by from 0.02 mm to 0.22 mm at a maximum. By providing the flange portion 13, the straight body portion 12 is less likely to be deformed. This makes it possible to reduce deformation of the straight body portion 12 even in a case where force acts on the inclined portion 11 to deform the inclined portion 11.

The inductor core 1 provided in the first and second embodiments described above is used by a core body to be described later being inserted into the tubular hole 10c. The core body is inserted such that the tip portion of the core body is disposed at the one end 10a side of the magnetic main body 10. The inclined portion 11 has a tapered shape. This allows the one end 10a of the magnetic main body 10 to be brought further closer to a position detection device such as a tablet that detects positions with an electromagnetic induction method or the like.

In this manner, the accuracy of position detection of the position detection device improves by forming the inclined portion 11 of the magnetic main body 10 to have a tapered shape. Since the tip portion of the magnetic main body 10 is tapered, the inclined portion 11 is configured to be easily displaced when the core body is displaced due to force applied to the tip portion of the core body.

The skewness Rsk of the outer peripheral surface 12b of the straight body portion 12 located at or around the inclined portion 11 is smaller than the skewness Rsk of the outer peripheral surface 12c of the straight body portion 12 located at or around the other end 10b. This configuration enables the inductor core 1 to be used as an electronic pen core body portion 2. Even if the number of times the electronic pen writes increases, a portion that comes into contact with the coil increases at the outer peripheral surface 12b of the straight body portion 12 located at or around the inclined portion 11, which results in an increase in friction coefficient. Thus, even if the coil at the front tip side is in a state where tension is less likely to act, the coil is less likely to be displaced from the original winding position. This makes malfunction less likely to occur.

By setting the skewness Rsk of the outer peripheral surface 12c at or around the other end 10b to be higher than that at or around the inclined portion 11, the percentage of open pores decreases. This improves the mechanical strength at or around the other end 10b, which reduces occurrence of plucking out due to contact with the coil.

The skewness Rsk of the outer peripheral surface 12c of the straight body portion 12 located at or around the other end 10b may be equal to or less than 4. In a case where the skewness Rsk of the outer peripheral surface 12c of the straight body 12 portion located at or around the other end 10b falls within this range, a portion that comes into contact with the coil increases at the outer peripheral surface 12b of the entire straight body portion 12. This makes the position of the coil further less likely to be displaced from the original state in which the coil is wound. Thus, it is possible to use the coil for a longer period of time.

A root mean square roughness Rq of the outer peripheral surface 12c of the straight body portion 12 located at or around the other end 10b is smaller than the root mean square roughness Rq of the outer peripheral surface 12b of the straight body portion 12 located at or around the inclined portion 11. This makes it possible to reduce the possibility of breakage of the coil or damage to a cover portion of the coil in a case where a cover wire such as a litz wire is wound at the outer peripheral surface 12c of the straight body portion 12 located at or around the other end 10b to form the coil.

The section height difference (Rδc) of the outer peripheral surface 12c of the straight body portion 12 located at or around the other end 10b is smaller than the section height difference (Rδc) of the outer peripheral surface 12b of the straight body portion 12 located at or around the inclined portion 11. This makes it possible to reduce the possibility of breakage of the coil or damage to a cover portion of the coil in a case where a cover wire such as a litz wire is wound at the outer peripheral surface 12c of the straight body portion 12 located at or around the other end 10b to form the coil.

The section height differences (Rδc) of the outer peripheral surfaces 12c, 12b represent a difference between the section height at a material ratio of 25% in the roughness curve of a target outer peripheral surface and the section height at a material ratio of 75% in the roughness curve of the target outer peripheral surface.

Table 1 shows the measurement results of surface texture of the magnetic main body 10 that constitutes the inductor core 1 described above. The skewness Rsk of the roughness curve, the root mean square roughness Rq, and the section height difference Rδc were measured in accordance with JIS B 0601:2001 using a laser microscope (ultra-depth color 3D shape measuring microscope (VK-9500) manufactured by Keyence Corp.). The measurement conditions were set such that: the multiplication factor was 200× magnification (eyepiece lens: 20×, objective lens: 10×); the measurement mode was color super-depth; the measurement resolution (pitch) in the height direction was 0.05 μm; the optical zoom was 1.0 time; the gain was 953; the observation range was 1315 μm×982 μm; the cutoff value λs was 2.5 μm; and the cutoff value λc was 0.08 mm.

In the observation range, a range in which focus is achieved (for example, 815 μm to 1315 μm×425 μm to 625 μm) was selected as the measurement range. At the time of calculating the numerical values, the number of samples was eight. The skewness Rsk of the roughness curve, the root mean square roughness Rq, and the section height difference Rδc were measured for each portion of the outer peripheral surface. The average values of these parameters were calculated, and were written in Table 1.

TABLE 1

| Portion | Rsk | Rq (μm) | Rδc (μm) |
|---|---|---|---|
| Inclined surface of inclined portion | −0.93 | 11.72 | 7.22 |
| Outer peripheral surface of straight body portion (at or around inclined portion) | 0.72 | 8.42 | 5.38 |
| Outer peripheral surface of straight body portion (at or around other end) | 2.18 | 6.18 | 4.48 |

As shown in Table 1, the skewness Rsk is as follows. The skewness was −0.93 at the inclined surface 11a of the inclined portion 11. The skewness was 0.72 at the outer peripheral surface 12b of the straight body portion 12 located at or around the inclined portion 11. The skewness was 2.18 at the outer peripheral surface 12c of the straight body portion 12 located at or around the other end 10b. In this manner, the skewness Rsk of the outer peripheral surface 12b of the straight body portion 12 located at or around the inclined portion 11 is smaller than the skewness Rsk of the outer peripheral surface 12c of the straight body portion 12 located at or around the other end 10b.

The root mean square roughness Rq is as follows. The root mean square roughness was 11.72 μm at the inclined surface 11a of the inclined portion 11. The root mean square roughness was 8.42 μm at the outer peripheral surface 12b of the straight body portion 12 located at or around the inclined portion 11. The root mean square roughness was 6.18 μm at the outer peripheral surface 12c of the straight body portion 12 located at or around the other end 10b. In this manner, the root mean square roughness Rq at the outer peripheral surface 12c of the straight body portion 12 located at or around the other end is smaller than the root mean square roughness Rq at the outer peripheral surface 12b of the straight body portion 12 located at or around the inclined portion 11.

The section height difference Rδc is as follows. The section height difference was 7.22 μm at the inclined surface 11a of the inclined portion 11. The section height difference was 5.38 μm at the outer peripheral surface 12b of the straight body portion 12 located at or around the inclined portion 11. The section height difference was 4.48 μm at the outer peripheral surface 12c of the straight body portion 12 located at or around the other end 10b. In this manner, the section height difference Rδc at the outer peripheral surface 12c of the straight body portion 12 located at or around the other end 10b is smaller than the section height difference Roc at the outer peripheral surface 12b of the straight body portion 12 located at or around the inclined portion 11.

By setting the root mean square roughness Rq of the outer peripheral surface 12b of the straight body portion 12 located at or around the inclined portion 11 to be equal to or less than 10 μm, the arithmetic mean roughness is further reduced at the outer peripheral surface 12c, around which the coil is wound, located at or around the other end 10b. This makes it possible to reduce the possibility of breakage of the coil or damage to the cover portion of the coil in a case where the cover wire such as a litz wire is wound at the outer peripheral surface 12c of the straight body portion 12 located at or around the other end 10b to form the coil.

The magnetic main body 10 is made of a ceramic having, as the main constituent, ferrite comprised of an oxide of Fe, Zn, Ni, and Cu, and a coefficient of variation CV of the average crystal grain size of the ceramic expressed as Equation 1 below may be not less than 0.08 and not more than 0.3.

$$CV = \sigma / x \qquad (1),$$

where x is the average value of average crystal grain sizes of the ceramic, and σ is the standard deviation of average crystal grain sizes of the ceramic.

The main constituent represents a constituent that accounts for not less than 95 mass % of all the constituents of the ceramic, and in particular, not less than 99 mass % is preferable.

The constituent that constitutes the ceramic can be identified from measurement results by an X-ray diffractometer using a CuKα beam. The content of each of the metal components of Fe, Ni, Zn, and Cu can be determined, for example, with an inductively coupled plasma (ICP) emission spectrophotometer or a fluorescence X-ray spectrometer, and it is only necessary to convert the content in terms of oxide.

In a case where the coefficient of variation CV is not less than 0.08, the grain size of crystal particles appropriately varies, and small crystal particles are disposed between large crystal particles. This makes it possible to increase the fracture toughness. In a case where the coefficient of variation CV is not more than 0.3, the percentage of crystal particles having large grain sizes relative to the standard deviation increases, which results in an increase in magnetic permeability. In a case where the coefficient of variation CV is not less than 0.08 and not more than 0.3, it is possible to achieve both high fracture toughness and high magnetic permeability. In particular, it is preferable that the coefficient of variation CV is not less than 0.1 and not more than 0.2.

The average crystal grain size can be determined in the following manner. First, the fracture surface of the inductor core 1 is polished with a copper disk using diamond abrasive grains having an average grain size $D_{50}$ of 3 μm. Thereafter, diamond abrasive particles with an average grain size $D_{50}$ of 0.5 μm are used for polishing with a tin grinder. The polished surface obtained through the polishing described above is etched at a temperature of 950° C. until the crystal particles and the grain boundary layer can be identified from each other, so that an observation surface is obtained.

Within a range of 155 μm×115 μm of the observation surface at 5000× magnification using a scanning electron microscope, six straight lines of the same length of 100 μm, for example, are drawn in a radial manner around a given point. The number of crystals existing on these six straight lines are divided by the individual straight lines, so that the average crystal grain size can be obtained.

Figure 7:
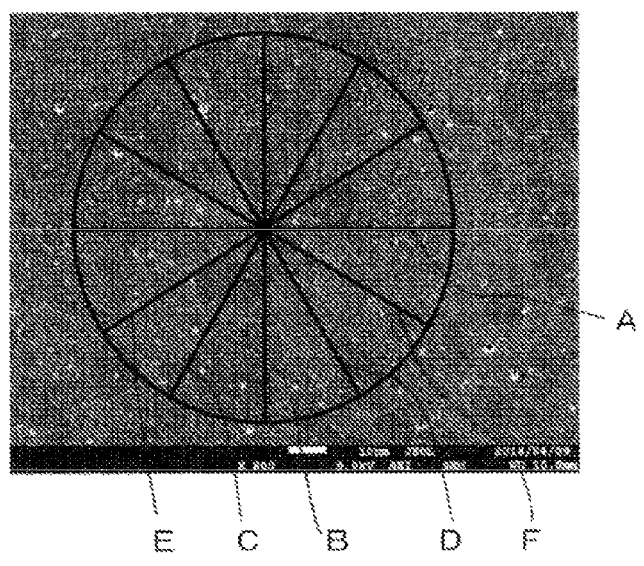
FIG. 7 is a photograph showing an example of an observation surface of the inductor core and the way in which straight lines are drawn.

FIG. 7 is a photograph showing an example of an observation surface of the inductor core and the way in which the straight lines are drawn. It is only necessary to calculate the average value, the standard deviation, and the coefficient of variation CV of the average crystal grain sizes by selecting seven screens of such an observation surface and setting 42 pieces of average crystal grain sizes as targets.

The kurtosis Ku of the average crystal grain size may be not less than 0. In a case where the kurtosis Ku of the average crystal grain size falls within this range, variation in the particle size of crystal particles is suppressed. Thus, aggregation of pores is reduced, and plucking-out generated from the contours or interiors of the pores can be reduced. In particular, it is preferable that the kurtosis Ku of the average crystal grain size is equal to or more than 1.

The kurtosis Ku represents an index (statistical amount) indicating to what extent the peak and tails of a distribution differ from those of normal distribution. If the kurtosis Ku is greater than 0, a distribution with a sharp peak is obtained. If the kurtosis Ku is equal to 0, the distribution becomes a normal distribution. If the kurtosis Ku is less than 0, the distribution becomes a distribution with a rounded peak. It is only necessary that the kurtosis Ku of the average crystal grain size be obtained using the function KURT available in Excel (trade name, available from Microsoft Corporation).

A skewness Sk of the average crystal grain size may be not less than 0. In a case where the skewness Sk of the average crystal grain size falls within this range, the distribution of grain sizes of crystal particles is shifted toward the direction of small grain size. Thus, aggregation of pores is reduced, and plucking-out generated from the contours or interiors of the pores can be further reduced.

The skewness Sk is an index (statistic) indicating a degree by which a distribution is distorted from a normal distribution, that is, the right-left symmetry of the distribution. If skewness Sk>0, a tail of the distribution extends toward the right side. If skewness Sk=0, the distribution is bilaterally symmetrical. If skewness Sk<0, the tail of the distribution extends toward the left side. It is only necessary that the skewness Sk of the average crystal grain size be obtained using the function SKEW available in Excel (trade name, available from Microsoft Corporation).

Of compositions in 100 mol % obtained by adding up the main constituents, it is preferable that the inductor core according to the present disclosure includes Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis.

In a case of the inductor core used in an electronic pen, the magnetic permeability, the specific resistance (electric resistance), and the Curie temperature are all required to be high. In a case where Fe is not less than 49 mol % on a $Fe_2O_3$ basis, the magnetic permeability increases, and in a case where Fe is not more than 50 mol %, the specific resistance increases. In a case where Zn is not less than 29 mol % on a ZnO basis, the magnetic permeability increases, and in a case where Zn is not more than 34 mol %, the Curie temperature increases. In a case where Ni is not less than 10 mol % on a NiO basis, the Curie temperature increases, and in a case where Ni is not more than 12.5 mol %, the magnetic permeability increases. In a case where Cu is not less than 4 mol % on a CuO basis, the magnetic permeability increases, and in a case where Cu is not more than 9 mol %, the magnetic permeability increases.

In the inductor core used in an electronic pen, in a case where Fe, Zn, Ni, and Cu fall within the ranges described above, it is possible to set the magnetic permeability to be equal to or more than 2000, the specific resistance to be equal to or more than $10^9$ Ω·m, and the Curie temperature to be equal to or more than 90° C., which enables the inductor core to be favorably used. In particular, it is preferable that a ratio (value in mol % on a ZnO basis/value in mol % on a NiO basis) between a value of Ni in mol % on an NiO basis and a value of Zn in mol % on a ZnO basis falls within a range of from 2.85 to 3.15.

It is preferable that the inductor core includes at least any of an oxide of Mo and an oxide of Bi, the content of the oxide of Mo with respect to 100 parts by mass of the main constituent is not less than 0.01 pats by mass and not more than 0.2 parts by mass on a $MoO_3$ basis, and the content of the oxide of Bi is not less than 0.01 parts by mass and not more than 0.2 parts by mass on a $Bi_2O_3$ basis. An oxide of Mo and oxide of Bi promote grain growth of main crystal. In addition, by setting the contents of the oxide of Mo and the oxide of Bi to fall within the ranges described above, it is possible to increase the magnetic permeability almost without the Curie temperature being decreased. In particular, it is preferable that the content of the oxide of Mo is not less than 0.05 parts by mass and not more than 0.1 parts by mass on a $MoO_3$ basis, and the content of the oxide of Bi is not less than 0.05 parts by mass and not more than 0.1 parts by mass on a $Bi_2O_3$ basis.

It is preferable that the inductor core includes at least any of an oxide of Mn and an oxide of Ti, the content of the oxide of Mn with respect to 100 parts by mass of the main constituent is not less than 0.01 parts by mass and not more than 0.3 parts by mass on a $MnO_2$ basis, and the content of the oxide of Ti is not less than 0.01 parts by mass and not more than 0.2 parts by mass on a $TiO_2$ basis. Mn and Ti can take a plurality of atomic values. Thus, at the time of firing, oxygen deficiency of a ferrite crystal serving as the main crystal is filled with excess oxygen resulting from a change in valences. This makes it possible to reduce the oxygen deficiency of the ferrite crystal and increase the magnetic permeability.

It is preferable that the inductor core includes an oxide of Zr, and the content of the oxide of Zr with respect to 100 parts by mass of the main constituent is not less than 0.01 parts by mass and not more than 0.2 parts by mass on a $ZrO_2$ basis. By setting the content of the oxide of Zr to fall within the range described above, it is possible to increase the specific resistance almost without the magnetic permeability being reduced. In particular, it is preferable that the content of the oxide of Zr is not less than 0.02 parts by mass and not more than 0.11 parts by mass on a $ZrO_2$ basis.

It is preferable that the inductor core includes an oxide of Cr, and the content of the oxide of Cr with respect to 100 parts by mass of the main constituent is not less than 0.02 parts by mass and not more than 0.3 parts by mass on a $Cr_2O_3$ basis. By setting the content of the oxide of Cr to be not less than 0.02 parts by mass, it is possible to promote sintering of ceramic and also increase a saturation magnetic flux density Bs of the inductor core. By setting the content of the oxide of Cr to be not more than 0.3 parts by mass, it is possible to suppress a magnetic loss Pcv and abnormal grain growth that may occur during sintering of ceramic.

It is only necessary that metal elements other than the main constituent are measured using an inductively coupled plasma (ICP) emission spectrophotometer or a glow discharge mass spectrometer device (GDMS), and are each converted on a basis of oxide thereof.

It is preferable that, in at least a portion of a ferrite crystal, the content of Fe at the center portion of the ferrite crystal is greater than the content of Fe at the outer edge portion of the ferrite crystal. This configuration makes it possible to provide high magnetic permeability while maintaining the Curie temperature. This is thought to be because this results from the fact that a large amount of divalent Fe exists in the center portion, which weakens an anisotropic magnetic field; and trivalent Fe exists at the outer edge portion, which makes hopping conduction less likely to occur and makes the resistance less likely to decrease.

The outer edge portion represents a region extending from the interface of a ferrite crystal observed at a surface (hereinafter, this surface is also referred to as an "observation surface") obtained by polishing the inductor core to a mirror finish and then performing thermal etching, to the length of 20% of a major axis. The major axis represents a length in the longest direction of a grain (ferrite crystal) as stated in JIS R 1670: 2006. The center portion means a region extending from the center of the major axis of a ferrite crystal toward the interface to the length of 20% of the major axis.

At the time of selecting a ferrite crystal from the observation surface, a ferrite crystal having a size of from $D_{40}$ to $D_{60}$ is selected, where the average crystal grain size calculated at the observation surface is $D_{50}$. The content of Fe in the ferrite crystal represents a content of Fe when the content of each spot is 100 mass %, the spot being a spot (φ1 μm) targeted at each of the center portion and the outer edge portion using an energy dispersive X-ray spectrometer (EDS).

It is preferable that a difference between the content of Fe at the center portion and the content of Fe at the outer edge portion is not less than 1.3 mass % and not more than 4.0 mass %. Such a configuration makes it possible to provide further higher magnetic permeability while maintaining the Curie temperature. The reason for this is thought to result from the fact that divalent Fe and trivalent Fe exist at the center portion of the ferrite crystal and the outer edge portion in an optimum proportion.

It is preferable that $I_2/I_1$ is not less than 0.29 and not more than 0.38, where $I_1$ is an X-ray diffraction peak intensity at a diffraction angle ($2\theta$) falling within a range of not less than 35° and not more than 36° and obtained through X-ray diffraction using the Cu-K$\alpha$ line, and $I_2$ is an X-ray diffraction peak intensity at a diffraction angle ($2\theta$) falling within a range of not less than 29.5° and not more than 30.5°. Such a configuration makes it possible to increase the Curie temperature while maintaining high magnetic permeability.

It is preferable that the half width of the X-ray diffraction peak intensity $I_1$ is not less than 0.05 and not more than 0.35. With such a configuration, it is possible to cause a ferrite crystal to grow while preventing the amorphous grain boundary layer from excessively increasing. This makes it possible to improve mechanical characteristics without reducing the magnetic permeability. In an obtained diffraction chart, the half width represents a value of half of the width between diffraction peaks at a half strength of the maximum value of the X-ray diffraction peak intensity at a diffraction angle ($2\theta$) falling within a range of not less than 35° and not more than 36°.

It is preferable to set $I_3/I_1$ to be equal to or less than 0.14, where $I_3$ is an X-ray diffraction peak intensity at a diffraction angle ($2\theta$) falling within a range of not less than 42° and not more than 43°. Such a configuration makes it possible to improve mechanical characteristics, which makes it possible to reduce the occurrence of chipping even if burrs are removed through barrel finishing or the like after sintering. This reduces damage due to stress occurring at the time of fixing or handling when a wire is wound or an electrode is attached.

At least the inclined portion 11 may include Mo, and the grain boundary layer interposed between adjacent ferrite crystals may contain more Mo than that contained in grains of a ferrite crystal. In a case where the grain boundary layer contains more Mo than that contained in grains of a ferrite crystal, the bonding force between ferrite crystal grains is suppressed. This makes it possible to easily obtain the inclined surface 11a2 having a large radius of curvature R1. To determine the content of Mo in grains of a ferrite crystal and in the grain boundary layer, it is only necessary to perform elementary analysis using a transmission electron microscope and an energy-dispersive X-ray spectrometer (EDS) in association with this transmission electron microscope.

The magnetic main body 10 used in the inductor core 1 can be manufactured in the following manner. First, as starting materials, oxides of Fe, Zn, Ni and Cu, or metal salts such as carbonates and nitrates for producing oxides by firing are prepared. At this time, the average grain size thereof is not less than 0.5 μm and not more than 5 μm when Fe is iron oxide ($Fe_2O_3$), Zn is zinc oxide (ZnO), Ni is nickel oxide (NiO) and Cu is copper oxide (CuO), for example.

Of compositions in 100 mol % obtained by adding up the main constituents, in a case of obtaining the inductor core including Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis, the Fe source powder, the Zn source powder, the Ni source powder, and the Cu source powder are set to fall within the ranges described above.

Below, description will be made of, as an example, a case where the Fe source powder, the Zn source powder, the Ni source powder, and the Cu source powder are all an oxide powder.

At the time of making a first raw material comprised of calcined powder of $Fe_2O_3$—ZnO—NiO and a second raw material comprised of calcined powder of $Fe_2O_3$—CuO, iron oxide, zinc oxide and nickel oxide are weighed to a desired amount for the first raw material. For the second raw material, iron oxide and copper oxide are weighed to a desired amount. Here, the added amount of iron oxide at the time of making the first raw material and the second raw material is set such that the added amount of iron oxide at the time of making the second raw material is set, for example, to the same mol % as that of the copper oxide and the residual amount is used to make the first raw material.

Subsequently, powders that have been weighed to be used for the first raw material and the second raw material are ground and are mixed with one another using separate ball mills, vibrating mills, or the like. Then, the first raw material is made by performing calcination in a reducing atmosphere at 750° C. for not less than 2 hours. The second raw material is made by performing calcination in a reducing atmosphere at 650° C. for not less than 2 hours. Through these procedures, calcined bodies are obtained.

Next, the calcined bodies to be the first raw material and the second raw material are put into separate ball mills or vibrating mills, and are ground to obtain the first raw material comprised of the calcined powder and the second raw material comprised of the calcined powder. At this time, in particular, the calcined body to be the second raw material is ground so that the average grain size $D_{50}$ is equal to or less than 0.7 μm. The first raw material and the second raw material are each weighed to a desired amount, and are mixed. The mixture is calcined again in the atmosphere under conditions of not less than 600° C. and not more than 700° C. at a temperature elevation rate of 100° C./hour or less, to obtain a calcined body comprised of oxide of Fe, Zn, Ni, and Cu and synthesized with ferrite.

Next, the calcined body obtained through calcination is put into a ball mill, a vibrating mill, or the like, and is ground. Then, a predetermined amount of binder or the like is added to obtain a slurry. The thus obtained slurry is sprayed using a spray drier to obtain granulation, and spherical granules are obtained.

The calcined body obtained through calcination is ground until the average grain size $D_{50}$ is equal to or less than 0.7 μm, whereby $I_3/I_1$ can be equal to or less than 0.14. In order to reduce the average grain size $D_{50}$, the grinding time needs to be longer. If grinding is performed for a long period of time, contamination of particles released from the ball used in grinding is highly likely to occur. Thus, it is preferable to set the lower limit value of the average grain size $D_{50}$ to 0.5 μm.

In order to make the inductor core contain oxides of Mo, Bi, Mn, Ti, Zr, Cr, or the like, it is only necessary to add, for example, powder of molybdenum oxide ($MoO_3$), bismuth oxide ($Bi_2O_3$), manganese oxide ($MnO_2$), titanium oxide ($TiO_2$), zirconium oxide ($ZrO_2$), chromium oxide ($Cr_2O_3$), or the like at the time of grinding after calcination.

In a case of obtaining the inductor core 1 in which at least the inclined portion 11 contains Mo, and the grain boundary layer interposed between adjacent ferrite crystals contains more Mo than that contained in grains of a ferrite crystal, powder of molybdenum oxide ($MoO_3$) is added, for example, by not less than 0.01 parts by mass and not more than 0.03 parts by mass with respect to 100 parts by mass of powder obtained by grinding the calcined body obtained through calcination, and a slurry is obtained. It is only necessary that the thus obtained slurry be sprayed to obtain granulation and thus obtain spherical granules.

By using the obtained spherical granules to perform press molding, a powder compact having a predetermined shape is obtained. At the time of this press molding, the surface texture of the mold is adjusted. In addition, adjustment is performed such that more pressure is applied to the straight body portion 12 side than to the inclined portion 11 side. In this manner, it is possible to configure the inclined surface 11a and the outer peripheral surface 12a such that the skewness Rsk decreases from the other end 10b of the magnetic main body 10 toward the one end 10a. In a similar manner, it is possible to configure the inclined surface 11a and the outer peripheral surface 12a such that the root mean square roughness Rq and the section height difference R$\delta$c decrease from the one end 10a of the magnetic main body 10 toward the other end 10b.

Thereafter, a degreasing process is performed on the powder compact in a degreasing furnace in a range of 400 to 800° C. to obtain a degreased body. Then, the degreased body is fired in a firing furnace at a maximum temperature of 1000 to 1200° C. for two to five hours to form the magnetic main body 10. This makes it possible to obtain the inductor core 1 according to the present embodiment.

In order to obtain an inductor core in which the half width of the X-ray diffraction peak intensity $I_1$ at a diffraction angle (2$\theta$) falling within a range of not less than 35° and not more than 36° is not less than 0.05 and not more than 0.35, it is preferable to set the temperature elevation rate to be not less than 100° C./hour and not more than 300° C./hour during firing.

In order to obtain an inductor core in which $I_2/I_1$ is not less than 0.29 and not more than 0.38, it is preferable that the temperature decrease rate from the maximum temperature to 600° C. is set to fall within a range of 500° C./hour to 1200° C./hour.

The inductor core in which the content of Fe at the center portion of a ferrite crystal is greater than the content of Fe at the outer edge portion of the ferrite crystal can be obtained in the following manner. That is, of starting raw materials, powders of zinc oxide, nickel oxide, and copper oxide are each weighed to within the ranges described above, and are mixed. Then, the powder after mixing is divided into two equal parts.

Powder of iron oxide with 25 mol % and powder of iron oxide with 24.5 mol % are added to the two equally divided powders, respectively, and these are ground and are mixed using a ball mill, vibrating mill, or the like. Here, the side to which 25 mol % is added is regarded as a third mixed powder, and the side to which 24.5 mol % is added is regarded as a fourth mixed powder. Next, in the atmosphere, calcination is performed at a temperature that falls within a range of from 700° C. to 1000° C. to obtain a third calcined body obtained by calcining the third mixed powder and a fourth calcined body obtained by calcining the fourth mixed powder.

Thereafter, the third calcined body together with water is placed into a ball mill or the like to be ground and mixed. The fourth calcined body together with water is also placed into another ball mill or the like to be ground and mixed. At this time, the fourth calcined body is ground and mixed for a longer period of time than the third calcined body is ground and mixed, thereby reducing the grain size thereof. After these bodies are combined, the predetermined amount of binder or the like is added to obtain a slurry. Next, this slurry is sprayed by using a spray drier to obtain granulation, and spherical granules are obtained. Thereafter, the manufacturing method until the inductor core 1 is obtained is the same as the manufacturing method described above.

The magnetic main body 10 that constitutes the inductor core 1 according to the first and second embodiments is formed by press molding. This eliminates the need of performing processes such as cutting, which makes it possible to reduce costs. If post-processes such as cutting are performed, the front surface deteriorates due to the post-processes, and this may deteriorate the characteristics of the inductor core. However, in a case of the inductor core 1 according to the present disclosure, no process is performed after firing, and no deterioration of the front surface occurs. This makes it possible to form the inductor core 1 having high reliability.

Figure 4:
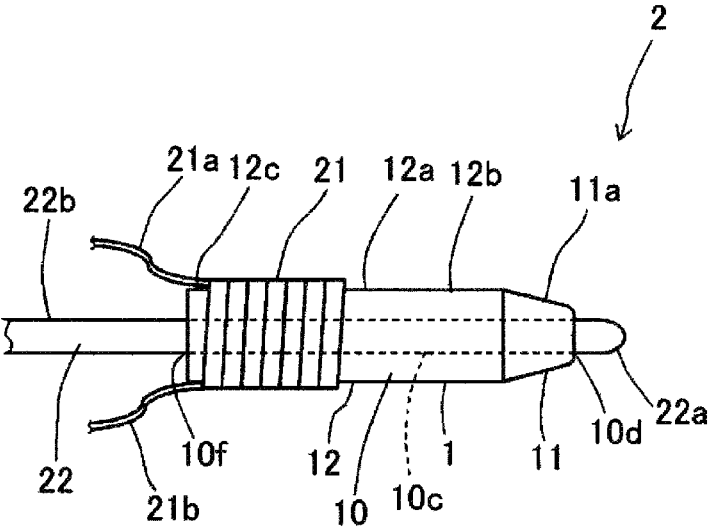
FIG. 4 is a plan view illustrating an embodiment of an electronic pen core body portion according to the present disclosure.

FIG. 4 is a plan view illustrating an embodiment of an electronic pen core body portion according to the present disclosure. The electronic pen core body portion 2 includes the inductor core 1, a coil 21 wound around the magnetic main body 10 of the inductor core 1, and a core body 22 inserted into the tubular hole 10c of the magnetic main body 10. Such an electronic pen core body portion 2 can be embedded in an electronic pen of an input device such as a tablet of an electromagnetic induction-type tablet.

For the core body 22, it is possible to use a metal rod made of SUS304 or SUS316 that is less likely to be magnetized, a metal material other than SUS, ceramic, resin, or the like. The core body 22 may be a core of a ballpoint pen that is capable of actually writing. The core body 22 is inserted into the tubular hole 10c of the magnetic main body 10, and is fixed. The core body 22 is fixed in the magnetic main body 10 at a position where the tip portion 22a protrudes from the opening 10d of the magnetic main body 10 at the one end 10a side by approximately 1 to 2 mm. A rear end portion 22b of the core body 22 protrudes from an opening 10f of the magnetic main body 10 at the other end 10b.

The coil 21 formed by winding an enamel wire or the like is disposed on the outer peripheral surface 12a in a region of the straight body portion 12 of the magnetic main body 10, the region being close to the other end 10b. The coil 21 is wound at a position of the straight body portion 12 of the magnetic main body 10 that is close to the other end side with a width of approximately 8 mm to 12 mm, and is fixed. Terminals 21a and 21b of the coil 21 are connected to a circuit substrate (not illustrated).

The coil 21 is provided by winding a cover wire such as an enamel wire, a litz wire, a USTC wire, or an urethane wire around the magnetic main body 10. The coil 21 is provided on the outer peripheral surface 12c of the straight body portion 12 located at or around the other end 10b. In a case where the outer peripheral surface 12c has a large surface roughness such as the arithmetic mean roughness Ra and the root mean square roughness Rq, the cover of the wound coil 21 may become damaged. However, by setting the arithmetic mean roughness Ra of the outer peripheral surface 12c of the straight body portion 12 located at or around the other end 10b to be smaller than the arithmetic mean roughness Ra of the outer peripheral surface 12b of the straight body portion 12 located at or around the inclined portion 11, it is possible to provide the coil 21 on a smooth outer peripheral surface 12c. This makes the coil 21 less likely to be damaged, which makes it possible to achieve the electronic pen core body portion 2 having high reliability.

Figure 5:
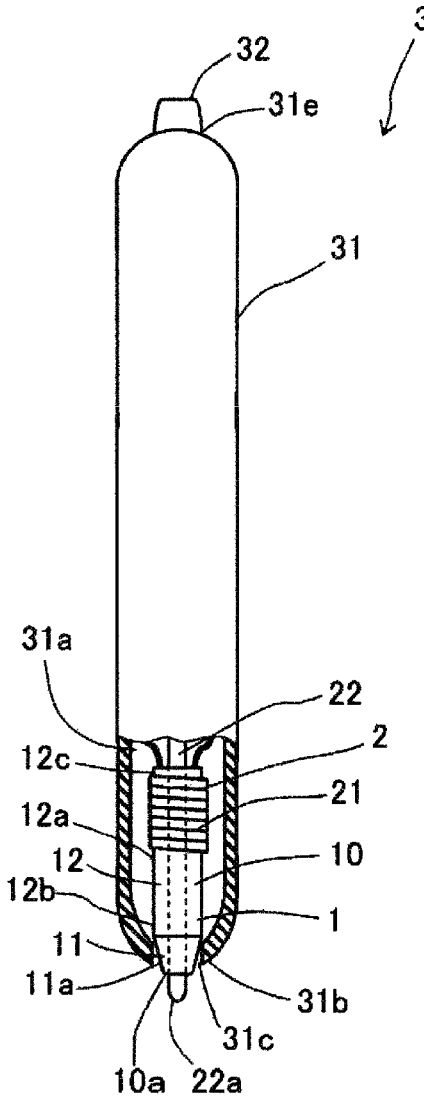
FIG. 5 is a plan view illustrating an embodiment of an electronic pen according to the present disclosure.

FIG. 5 is a diagram illustrating an embodiment of an electronic pen according to the present disclosure. In FIG. 5, a portion of the housing 31 of an electronic pen 3 is not illustrated. The electronic pen core body portion 2 described above is accommodated in the housing 31 to configure the electronic pen 3. The electronic pen 3 is configured such that the electronic pen core body portion 2 and a circuit substrate (not illustrated) are accommodated in a hollow portion 31a of the housing 31 having a tubular shape. Such an electronic pen 3 is provided to an input device such as a tablet of an electromagnetic induction type, and is used as a way to input a position. An opening 31c that allows the tip portion 22a of the core body 22 to protrude is formed at a tip portion 31b of the housing 31. The tip portion 22a is configured to be able to protrude from the opening 31c or be accommodated within the housing 31 using a knock mechanism.

For example, an opening 31e is formed at a rear end portion 31d of the housing 31, and a knock rod 32 protrudes from the opening 31e. By depressing the knock rod 32, a user can cause the tip portion 22a of the core body 22 to be extended from or inserted into the housing 31. In the present embodiment, the tip portion 22a of the core body 22 is configured to be extended from or inserted into the opening 31c. However, the tip portion 22a of the core body 22 may be fixed in a state of protruding from the opening 31c. In this case, the knock mechanism is not necessary. Such an electronic pen 3 includes the electronic pen core body portion 2 including the coil 21 that is less likely to be damaged. This makes it possible to achieve the electronic pen 3 having high reliability.

Figure 6:
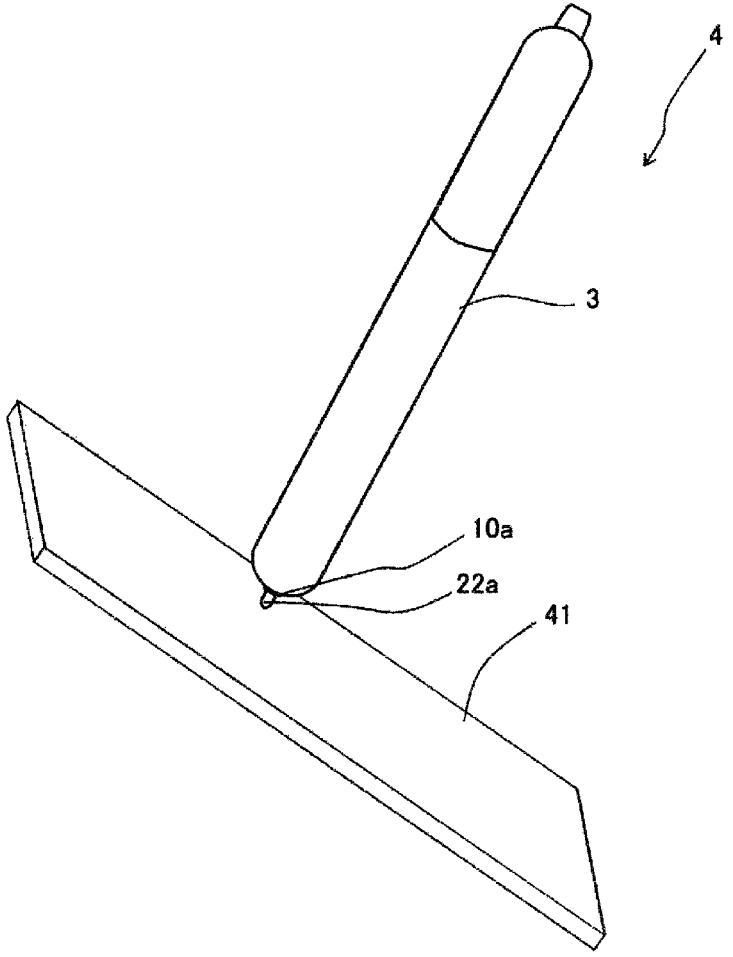
FIG. 6 is a perspective view illustrating an embodiment of an input device according to the present disclosure.

FIG. 6 is a perspective view illustrating an embodiment of an input device according to the present disclosure. An input device 4 includes the electronic pen 3 and a tablet 41 serving as a position detection device including a sensor configured to detect a position. The input device 4 can detect a position where the tip portion 22a of the core body 22 comes into contact with the tablet 41. In addition to the tablet 41, the position detection device may be a mobile terminal or the like including a touch panel display. An electromagnetic induction method can be used as the method of detecting position at the input device 4. Such an input device 4 includes the electronic pen 3 containing the electronic pen core body portion 2 in which the coil 21 is less likely to be damaged. This makes it possible to achieve the input device 4 having high reliability.

The magnetic main bodies 10 used in the inductor core 1 illustrated in FIGS. 1 to 5 each have a tubular shape. However, the magnetic main body 10 may have a pillar shape that does not include the tubular hole 10c.

Figure 8:
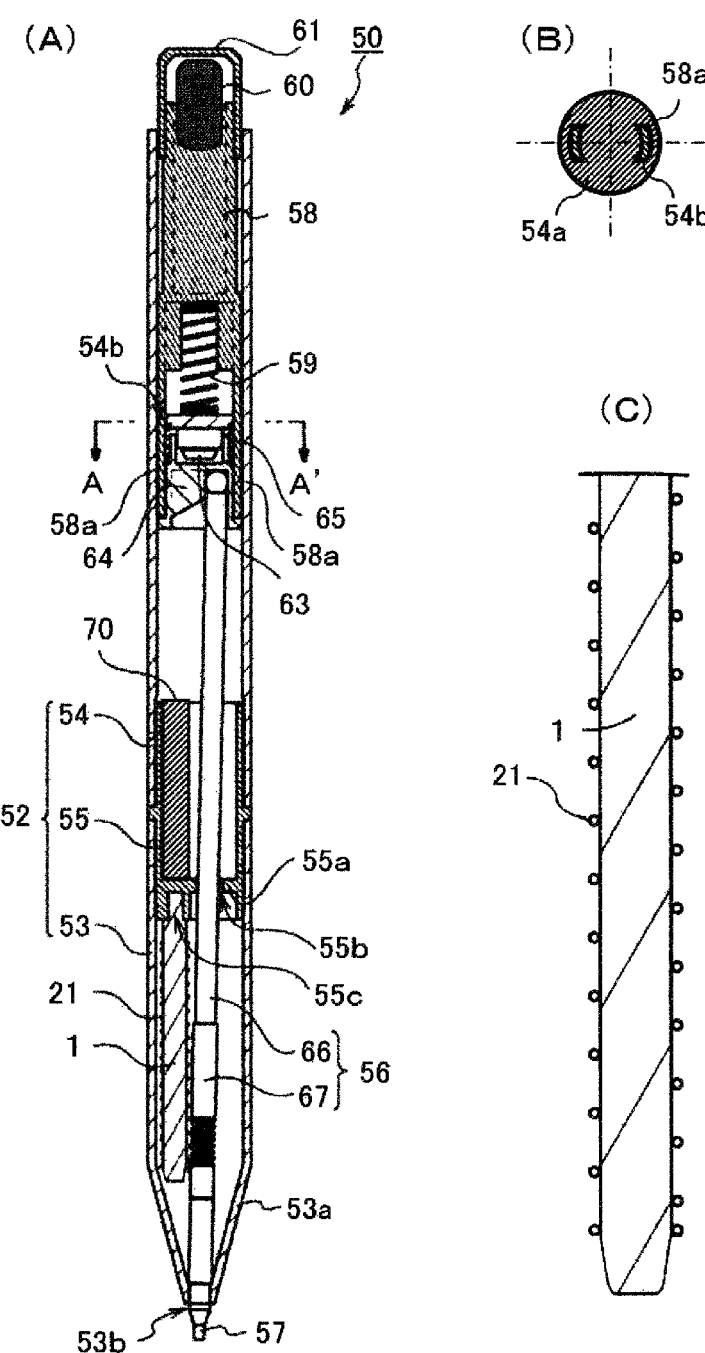
FIG. 8 is a diagram illustrating another embodiment of an electronic pen according to the present disclosure, where (A) is a cross-sectional view taken along the direction of the central axis; (B) is a cross-sectional view taken along the line A-A' in (A); and (C) is a portion of the enlarged view of the inductor core illustrated in (A).

FIG. 8 illustrates another embodiment of an electronic pen according to the present disclosure. FIG. 8(A) is a cross-sectional view taken along the direction of the central axis. FIG. 8(B) is a cross-sectional view taken along the line A-A' in FIG. 8(A). FIG. 8(C) is a portion of the enlarged view of the inductor core illustrated in (A). The electronic pen illustrated in FIG. 8 is a mechanical pencil 50 that houses a core (not illustrated) having a diameter that falls within a range of, for example, from 0.2 mm to 2 mm, in which the core is pushed out to perform writing.

A housing 52 made of synthetic resin is formed into a substantially cylindrical shape by injection molding. A first tubular body 53 disposed at the front tip side and a second tubular body 54 disposed at a rear end side are connected via a shaft joint 55. The tip portion of the first tubular body 53 includes a tapered portion 53a having an outer diameter gradually decreasing toward the tip end. The tip end of the tapered portion 53a is provided with an opening portion 53b from which a writing tip 57 of a mechanical pencil unit 56 that will be described later protrudes.

As illustrated in FIG. 8(B), the second tubular body 54 includes a rearward separation wall 54a orthogonal to the central axis at a middle point in the direction of the central axis. The rearward separation wall 54a includes a pair of leg-portion through holes 54b each having a circular arc shape. The leg-portion through holes 54b are provided across the central axis. The leg-portion through hole 54b is a hole configured to receive insertion of a leg portion 58a of an eraser-receiving base 58 that will be described later.

The eraser-receiving base 58, which is a portion of the knock mechanism of the mechanical pencil 50, is inserted into a rear internal space of the rearward separation wall 54a of the second tubular body 54. A knock spring 59 is inserted into an internal space at the front tip side of the eraser-receiving base 58. The tip end of the knock spring 59 is in contact with the surface of the rearward separation wall 54a at the rear end side. The rear end portion of the eraser-receiving base 58 protrudes from the rear end edge of the second tubular body 54, and has a rear end edge provided with a recessed portion where an eraser 60 is mounted.

The eraser 60 together with a portion of the eraser-receiving base 58 that protrudes from the rear end edge of the second tubular body 54 is covered with an eraser cover 61 having a front tip side being opened and having a cylindrical shape. As described later, the eraser cover 61 also functions as a knock button for the mechanical pencil 56. In addition, a pair of leg portions 58a protrude from the tip end of the eraser-receiving base 58. The leg portions 58a extend through the rearward separation wall 54a in a freely slidable manner in a rear-tip direction in association with a knock operation for pressing the eraser cover 61.

A pressure sensing sensor 63 is fixed at a surface of the rearward separation wall 54a of the second tubular body 54 at the front tip side. A refill joint 64 is provided so as to surround this pressure sensing sensor 63. This refill joint 64 is connected to the leg portion 58a that extends through the rearward separation wall 54a, and is configured to be able to move in a rear-tip direction within the second tubular body 54 in association with the knock operation of the eraser cover 61.

A pressure sensing sensor spring 65 is interposed between the refill joint 64 and the surface of the rearward separation wall 54a at the front tip side. In a state where neither knock operation nor writing is performed, the refill joint 64 and the pressure sensing sensor 63 are not in contact with each other, and the core is not in a state of protruding from the writing tip 57. A rear end of a core case pipe 66 of the mechanical pencil unit 56 serving as a writing unit is inserted into and fixed at the refill joint 64. With this configuration, the core case pipe 66 moves in a rear-tip direction in association with movement of the refill joint 64 in the rear-tip direction.

A frontward separation wall 55a orthogonal to the axial direction is formed at or around the tip end of the interior of the shaft joint 55. A unit through hole 55b is formed in this frontward separation wall 55a, and the core case pipe 66 penetrates through the unit through hole 55b. A writing tip 69 serving as a tip portion of an interior mechanism 67 connected to the tip end of the core case pipe 66 protrudes from the opening portion 53b.

A core mounting hole 55c where a rear end of the inductor core 1 is mounted is formed in a surface of the frontward separation wall 55a at the front tip side. The inductor core 1 has a pillar shape, and the coil 21 is wound around the periphery of the straight body portion of the cylindrical column body. The inductor core 1 is disposed alongside the mechanical pencil unit 56, and the tip end thereof reaches the tapered portion 53a. In addition, a capacitor 70 is housed in the internal space of the shaft joint 55 at the rearward side. The coil 21, the capacitor 70, and the pressure sensing sensor 63 form a circuit through wiring (not illustrated).

Once writing is performed at a target writing surface using the mechanical pencil unit 56, the coil 21 wound around the inductor core 1 generates electromagnetic induction. This electromagnetic induction causes an electrical current to flow in the circuit, which makes it possible to detect a contact position of the mechanical pencil unit 56 using a position detection device (not illustrated) provided under the target writing surface of the input device. Then, the input device recognizes, as coordinate information, the position where electromagnetic induction is generated, which makes it possible to record a written line as electronic data.

The embodiments have been described in detail above. However, the present invention is not limited to the embodiments described above, and various modifications or improvements or the like can be made without departing from the main gist of the present invention.

REFERENCE SIGNS LIST

1 Inductor core
2 Electronic pen core body portion
3 Electronic pen
4 Input device
10 Magnetic main body
10*a* One end
10*b* Other end
11 Inclined portion
11*a* Inclined surface
12 Straight body portion
12*a*, 12*b*, 12*c* Outer peripheral surface

The invention claimed is:

1. An inductor core comprising
a magnetic main body having a tubular shape or a pillar shape and comprised of a magnetic material, wherein the magnetic main body includes:
an inclined portion including an inclined surface that constitutes an outer circumferential surface of a truncated cone having an outer diameter increasing from one end of the magnetic main body toward the other end; and
a straight body portion that is coaxial with the inclined portion and extends from the other end toward the one end, the straight body portion being connected to the inclined portion and including an outer peripheral surface that constitutes an outer circumferential surface of a circular tubular body or a cylindrical column body, and
a skewness Rsk of an outer peripheral surface of the straight body portion located at or around the inclined portion is smaller than a skewness Rsk of an outer peripheral surface of the straight body portion located at or around the other end.

2. The inductor core according to claim 1, wherein the skewness Rsk of the outer peripheral surface of the straight body portion located at or around the other end is not more than 4.

3. The inductor core according to claim 1, wherein a root mean square roughness Rq of the outer peripheral surface of the straight body portion located at or around the other end is smaller than a root mean square roughness Rq of the outer peripheral surface of the straight body portion located at or around the inclined portion.

4. The inductor core according to claim 3, wherein the root mean square roughness Rq of the outer peripheral surface of the straight body portion located at or around the inclined portion is not more than 10 μm.

5. The inductor core according to claim 1, wherein
the magnetic main body is made of a ceramic containing, as a main constituent, ferrite comprised of an oxide of Fe, Zn, Ni, and Cu, and
a coefficient of variation CV of an average crystal grain size of the ceramic expressed as Equation 1 below is not less than 0.08 and not more than 0.3, $$CV = \sigma/x \tag{1},$$

where x is an average value of the average crystal grain size of the ceramic, and σ is a standard deviation of the average crystal grain size of the ceramic.

6. The inductor core according to claim 5, wherein a kurtosis Ku of the average crystal grain size is equal to or more than 0.

7. The inductor core according to claim 5, wherein a composition in 100 mol % obtained by adding up the main constituents includes Fe of not less than 49 mol % and not more than 50 mol % on a $Fe_2O_3$ basis, Zn of not less than 29 mol % and not more than 34 mol % on a ZnO basis, Ni of not less than 10 mol % and not more than 12.5 mol % on a NiO basis, and Cu of not less than 4 mol % and not more than 9 mol % on a CuO basis.

8. The inductor core according to claim 7, comprising at least any of an oxide of Mo and an oxide of Bi, wherein a content of the oxide of Mo with respect to 100 parts by mass of the main constituent is not less than 0.01 parts by mass and not more than 0.2 parts by mass on a $MoO_3$ basis, or a content of the oxide of Bi with respect to 100 parts by mass of the main constituent is not less than 0.01 parts by mass and not more than 0.2 parts by mass on a $Bi_2O_3$ basis.

9. The inductor core according to claim 8, comprising at least any of an oxide of Mn and an oxide of Ti, wherein a content of the oxide of Mn with respect to 100 parts by mass of the main constituent is not less than 0.01 parts by mass and not more than 0.3 parts by mass on a $MnO_2$ basis, or a content of the oxide of Ti with respect to 100 parts by mass of the main constituent is not less than 0.01 parts by mass and not more than 0.2 parts by mass on a $TiO_2$ basis.

10. The inductor core according to claim 7, comprising an oxide of Zr, wherein a content of the oxide of Zr with respect to 100 parts by mass of the main constituent is not less than 0.01 parts by mass and not more than 0.2 parts by mass on a $ZrO_2$ basis.

11. The inductor core according to claim 7, comprising an oxide of Cr, wherein a content of the oxide of Cr with respect to 100 parts by mass of the main constituent is not less than 0.02 parts by mass and not more than 0.3 parts by mass on a $Cr_2O_3$ basis.

12. The inductor core according to claim 7, wherein at least the inclined portion contains Mo, and a grain boundary layer interposed between the ferrite crystals adjacent to each other contains more Mo than that contained in grains of a ferrite crystal.

13. The inductor core according to claim 7, wherein in at least a portion of a ferrite crystal, a content of Fe at a center portion of the ferrite crystal is greater than a content of Fe at an outer edge portion of the ferrite crystal.

14. The inductor core according to claim 13, wherein a difference between the content of Fe at the center portion and the content of Fe at the outer edge portion is not less than 1.3 mass % and not more than 4.0 mass %.

15. The inductor core according to claim 7, wherein $I_2/I_1$ is not less than 0.29 and not more than 0.38, where $I_1$ is an X-ray diffraction peak intensity at a diffraction angle ($2\theta$) falling within a range of not less than 35° and not more than 36° and obtained through X-ray diffraction using a Cu-K$\alpha$ line, and $I_2$ is an X-ray diffraction peak intensity at a diffraction angle ($2\theta$) falling within a range of not less than 29.5° and not more than 30.5°.

16. The inductor core according to claim 7, wherein a half width of the X-ray diffraction peak intensity $I_1$ is not less than 0.05 and not more than 0.35.

17. The inductor core according to claim 15, wherein $I_3/I_1$ is equal to or less than 0.14, where $I_3$ is an X-ray diffraction peak intensity at a diffraction angle ($2\theta$) falling within a range of not less than 42° and not more than 43°.

18. An electronic pen comprising:

a housing including an opening; and the electronic pen core body portion comprising the inductor core according to claim 1, and a core body configured to be inserted into the inductor core and disposed in a manner such that a tip portion protrudes from one end of the inductor core; wherein the electronic pen core body portion is accommodated in the housing, and the tip portion of the electronic pen core body portion protrudes from the opening of the housing or is disposed to be able to protrude from the opening of the housing.

19. An electronic pen comprising:

a housing including an opening;

a writing unit that can be used to write to a target writing surface; and the inductor core according to claim 1, wherein the writing unit is disposed along a central axis of the housing, and the inductor core is disposed alongside the writing unit within the housing.

20. An input device comprising:

the electronic pen according to claim 18; and a position detection device including a sensor configured to detect a position at which the electronic pen approaches.

\* \* \* \* \*